US006636872B1

(12) United States Patent
Heath et al.

(10) Patent No.: US 6,636,872 B1
(45) Date of Patent: Oct. 21, 2003

(54) DATA FILE SYNCHRONIZATION

(75) Inventors: Clifford Z Heath, Mount Waverly (AU); Paul Hughes, Langwarrin (AU)

(73) Assignee: Managesoft Corporation Limited, Box Hill (AU)

( * ) Notice: Subject to any disclaimer, the term of this patent is extended or adjusted under 35 U.S.C. 154(b) by 0 days.

(21) Appl. No.: 09/507,792

(22) Filed: Feb. 22, 2000

(30) Foreign Application Priority Data

Mar. 2, 1999 (AU) ............................................ 18536/99

(51) Int. Cl.$^7$ .............................................. G06F 17/30
(52) U.S. Cl. ......................... 707/201; 707/10; 707/101; 709/248
(58) Field of Search .............................. 707/2, 3, 4, 10, 707/101, 102, 200; 709/203, 201, 217, 219, 246, 248; 717/1, 4, 5, 7, 9

(56) References Cited

U.S. PATENT DOCUMENTS

| 5,261,060 A | * 11/1993 | Free .......................... 395/325 |
| 5,446,888 A | 8/1995 | Pyne .......................... 395/600 |
| 5,479,654 A | 12/1995 | Squibb ....................... 395/600 |
| 5,581,764 A | 12/1996 | Fitzgerald et al. .......... 395/703 |
| 5,684,990 A | * 11/1997 | Boothby ..................... 395/619 |
| 5,715,461 A | 2/1998 | Yoshitomi ................... 395/710 |
| 5,721,907 A | * 2/1998 | Pyne .......................... 395/610 |
| 5,752,042 A | 5/1998 | Cole et al. .................. 395/712 |
| 5,805,809 A | * 9/1998 | Singh et al. ............. 395/200.33 |
| 5,852,717 A | * 12/1998 | Bhide et al. ............. 395/200.33 |
| 5,884,325 A | * 3/1999 | Bauer et al. ................. 707/201 |
| 5,978,805 A | * 11/1999 | Carson ........................ 707/10 |
| 6,226,650 B1 | * 5/2001 | Mahajan et al. ............ 707/201 |
| 6,289,358 B1 | * 9/2001 | Mattis et al. ............... 707/203 |

FOREIGN PATENT DOCUMENTS

| WO | WO 96/25801 | * 8/1996 | ............. H03M/7/30 |
| WO | WO 98/35306 | 8/1998 | |

* cited by examiner

Primary Examiner—Hosain T. Alam
Assistant Examiner—Jacques Veillard
(74) Attorney, Agent, or Firm—Nixon & Vanderhye, PC

(57) ABSTRACT

A method for synchronising data between a receiving computer and a sending computer by way of a computer network or the like, wherein the sending computer has a source file and the receiving computer has a reference file. The source file is arranged at the sending computer into a sequence of data blocks, each block comprising a predetermined number of data units (e.g. bytes), and a source key value is computed for each block in the source file, and the source key values are transmitted to the receiving computer. At the receiving computer, the source key values are compared with reference key values computed for each predetermined number of contiguous data units in the reference file to determine matches between source key values and reference key values. Then, based on indications of which source keys do not have matching reference keys, specific data blocks are transmitted from the source file corresponding to the unmatched source keys. Then, the receiving computer constructs a target file from the contiguous data units in the reference file determined to have. reference key values matching respective source key values and the data blocks from the source file received from the sending computer. In the context of the Internet, the provision of the source key values and data blocks to the receiving computer can conveniently be carried out in appropriate circumstances by a proxy server or the like, using standard caching techniques.

15 Claims, 4 Drawing Sheets

DATA FILE SYNCHRONIZATION

BACKGROUND OF THE INVENTION

1. Field of the Invention

This invention relates to the synchronisation of data files, and in particular to efficient methods for updating one or more remote data file to coincide with a source data file, over a communications link, network or the like.

2. Related Art

There are numerous situations, particularly in the field of computer networks, where several computers store data files which are intended to coincide with one another. Additions and/or alterations to the data file may typically be made at one of the computers, and then it is necessary to make the same additions and/or alterations to the files at the other computers to ensure they are all synchronised with the latest version of the file. The simplest way of achieving that synchronism is to merely communicate the entire changed file to all of the relevant computers and replace the entire existing files thereat. However, where the computers communicate the data to one another over a communications medium such as a telecommunications network or the like, it is frequently desirable to reduce the amount of data to be communicated, such as to save time in transferring large amounts of data over the limited bandwidth communications link. Thus, it is desirable if only the changed portions of the file can be distributed from the computer at which the file was changed to the other computers, so that the changed portions can be combined with the unchanged portions to reconstruct the entire file.

One application in which this function is useful is in distributing computer software or other data files over the Internet or World Wide Web. For example, software distributed by a vendor to users over the Internet may be periodically updated by the vendor. Even if only a small portion of the program code is changed by the update, it may be necessary for all of the users to download the new program file from the vendor computer server. Systems employing the above mentioned scheme of determining the differences between files and transferring only the changed portions have been proposed, but also suffer from some drawbacks. One known system involves summarising by sections the version of the file held at the user's computer and sending the file summary (compressed to a fraction of the actual file) to the server. At the server the received file summary is compared to the (updated) source file to determine the differences therebetween, and the server then transmits back to the user's computer the unencoded portions of the source file which are not found in the version of the file existing on the user's computer. The new file portions are then inserted into the existing file to form a file which corresponds precisely with the source file.

One difficulty which is inherent in the above described system is that a large computational burden is placed on the server computer if files at numerous user's computers require updating. For example, the server computer must analyse the file summary from each user by comparing it against the source file. When hundreds or thousands of users are desirous of updating their data files, the operation of the server computer can be slowed considerably, which may negate the time savings of employing the updating scheme or necessitate the use of powerful processing equipment at the server.

BRIEF SUMMARY OF THE INVENTION

In accordance with the present invention, there is provided a method for synchronising data between a receiving computer and a sending computer, wherein the sending computer has a source file and the receiving computer has a reference file and the receiving and sending computers are coupled for communication therebetween by way of a communications link or network, the method comprising the steps of:

i) arranging the source file at the sending computer into a sequence of data blocks, each block comprising a predetermined number of data units, and computing a source key value for each block in the source file;

ii) transmitting the source key values from the sending computer to the receiving computer;

iii) at the receiving computer, comparing the source key values with reference key values computed for each predetermined number of contiguous data units in the reference file to determine matches between source key values and reference key values;

iv) communicating from the receiving computer to the sending computer an indication of which source keys do not have matching reference keys, and transmitting data blocks from the source file corresponding to the unmatched source keys from the sending computer to the receiving computer; and v) constructing at the receiving computer a target file from the contiguous data units in the reference file determined to have reference key values matching respective source key values and the data blocks from the source file received from the sending computer, wherein the constructed target file at the receiving computer is synchronised with the source file at the sending computer.

Preferably the source key values for the sequence of source file data blocks are pre-computed and stored for subsequent use. In one form of the invention, the sending computer and receiving computer are coupled to communicate by way of an intervening computer containing a cache memory, and wherein a copy of the source key values are stored in the intervening computer cache memory and provided therefrom to the receiving computer.

The present invention also provides a method for constructing a target data file at a first computer from a reference file stored at the first computer and a source file at a remote second computer such that the constructed target file is synchronised with the source file, comprising the steps of:

i) requesting and receiving from the remote second computer a source file summary comprising a sequence of source key values being codes derived from data blocks of predetermined length making up the source file;

ii) generating a reference key value for each contiguous portion of the reference file of predetermined length and comparing the reference key value with the received source key values, to determine matches therebetween;

iii) requesting and receiving from the remote second computer those data blocks from the source file for which no match was found between the corresponding source key value and the reference key values; and iv) constructing a target data file from the received source file data blocks and those contiguous portions of the reference file for which the corresponding reference key value was found to match a source key value, wherein the constructed target file is synchronised with the source file.

In one form of the invention, the first and second computers are coupled to communicate over a computer network including a proxy computer which is closer or more conveniently located to communicate with the first computer than is the second computer, and wherein the step of requesting and receiving the source file summary includes providing the source file summary to the first computer from a copy of the source file summary generated at the second computer and previously received and stored by the proxy computer. Furthermore, the step of requesting and receiving data blocks for which no match was found may include providing those data blocks to the first computer from the proxy computer from a copy of the source file data blocks previously provided from the second computer and stored in a cache memory at the proxy computer.

BRIEF DESCRIPTION OF THE DRAWINGS

The invention is described in greater detail hereinafter, by way of example only, with reference to the accompanying drawings, wherein.

Figure 1:
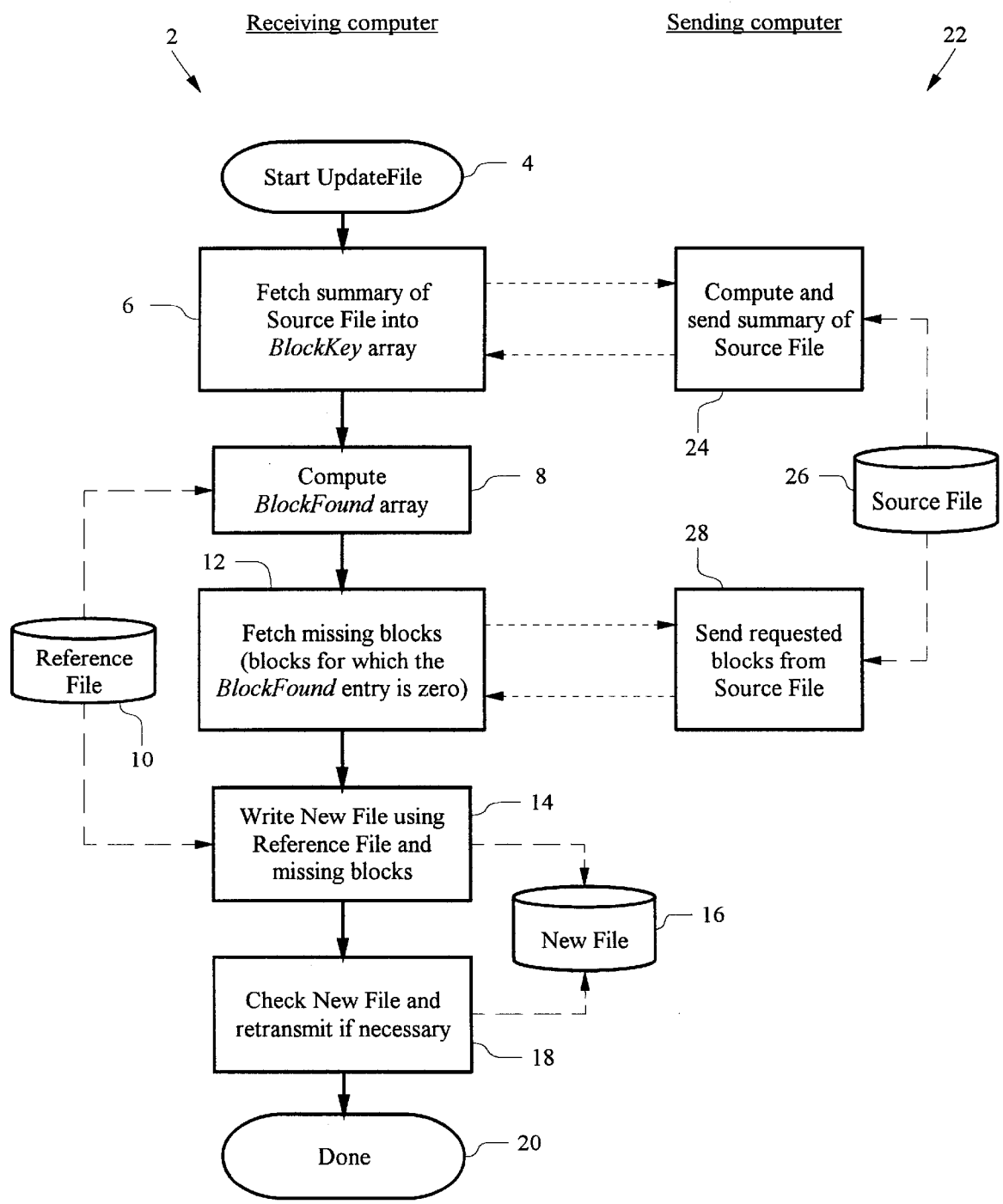
FIG. 1 is a flowchart of an overall procedure for file synchronisation according to an embodiment of the present invention, illustrating operations at both sending and receiving computers.

A file synchronization procedure in accordance with an embodiment of the present invention would typically involve the use of a sending computer and a receiving computer coupled to the sending computer by way of a communications medium. For example, the sending computer might comprise a computer file server or the like, such as a web server having the usual components of processing circuitry, memory, data storage and communications ports. In the case of a web server, the sending computer may have one or more communications ports dedicated to a permanent communications link with the Internet or corporate network, so as to enable the provision of data to other computers coupled to the Internet in reply to requests for that data. In this implementation, the receiving computer may also have a dedicated connection to the Internet communications network, or may be connectable to the Internet by way of a dial-up connection through an Internet service provider. Thus, the receiving computer for use in embodiments of the present invention may also be of conventional construction having processing circuitry, memory, data storage and communications apparatus such as a modem or the like. As will be apparent to those of ordinary skill in the art, in the above example the sending and receiving computers would communicate with one another asynchronously using a TCP/IP communications protocol.

Embodiments of the present invention are aimed at synchronising data held in respective files at the sending computer and receiving computer. In many situations, as discussed above, it is desirable for a data file at the receiving computer to be identical with that at the sending computer, such as in the case of mirrored databases, software updates and the like. However, it is undesirable in many circumstances to require that the entire file be transferred from the sending computer to the receiving computer. Embodiments of the present invention aim to further reduce the computational and communications burden on the sending computer, as will be appreciated from the following description, since in many circumstances a multitude of receiving computers may request synchronisation of data files with the sending computer when the sending computer file is altered or updated.

The basis of the preferred embodiment of the present invention involves the sending computer having a source file and one or more receiving computers each having a reference file which is intended to be synchronised so as to be identical to the source file. In the file synchronisation method, each receiving computer identifies and isolates the differences between the particular reference file it contains and the source file, and requests transmission of only those differences from the sending computer. The receiving computer combines these differences with data from the reference file to form a new target file, which is an exact representation of the source file. The method divides the data in the source file into a plurality of blocks and associates each block of data with a key value. The key values are sent to each receiving computer in the form of an array. At each receiving computer, a block of data in the particular reference file is identified, its key value computed, and the key value is then compared to the keys in the array. If a match is found, the block is written to the corresponding location in the target file and the matching entry in the key array is marked as indicating a retained block. Otherwise, a new block of data is identified at an offset of one byte from the previous block, and this block is analysed. The latter steps are continued until all possible blocks have been considered. The receiving computer then uses the retained blocks marks to build a list of the numbers of the blocks of the source file which were not found in the reference file, and transmits this list to the sending computer. The sending computer transmits the data from the requested blocks to the receiving computer, which writes them to the respective locations in the target file. In this way, a complete representation of the source file can be reassembled at the receiving computer.

As will become apparent, the significant advantages of this method include that the sending computer only need compute the key value array for a source file once, which can then be saved for use in satisfying subsequent requests from other receiving computers for file synchronisation. Furthermore, the remaining computational burden falls to the receiving computers, rather than the heavily used sending computer file server.

FIG. 1 is a flowchart of an overall file synchronisation procedure according to an embodiment of the present invention, illustrating the primary operations occurring at both the receiving computer (2) and the sending computer (22). The procedure 2 at the receiving computer begins with step 4 where the computer software implementing the procedure initialises in conventional manner. The initialisation includes, for example, identification of the reference file at the receiving computer which is to be synchronised, identification of the source file to which the reference file is to be synchronised and establishment of a communications channel or the like with the sending computer containing the appropriate source file. The receiving computer procedure 2 then fetches a summary of the source file at step 6, which is stored in an array designated BlockKey. The summary of the source file is determined at the sending computer by procedure 22 at step 24 having regard to the stored source file 26. The source file summary, and in particular the BlockKey array may be computed at the sending computer at the time the request for provision is received from the receiving computer, or it may have been computed at any time previously.

Figure 2:
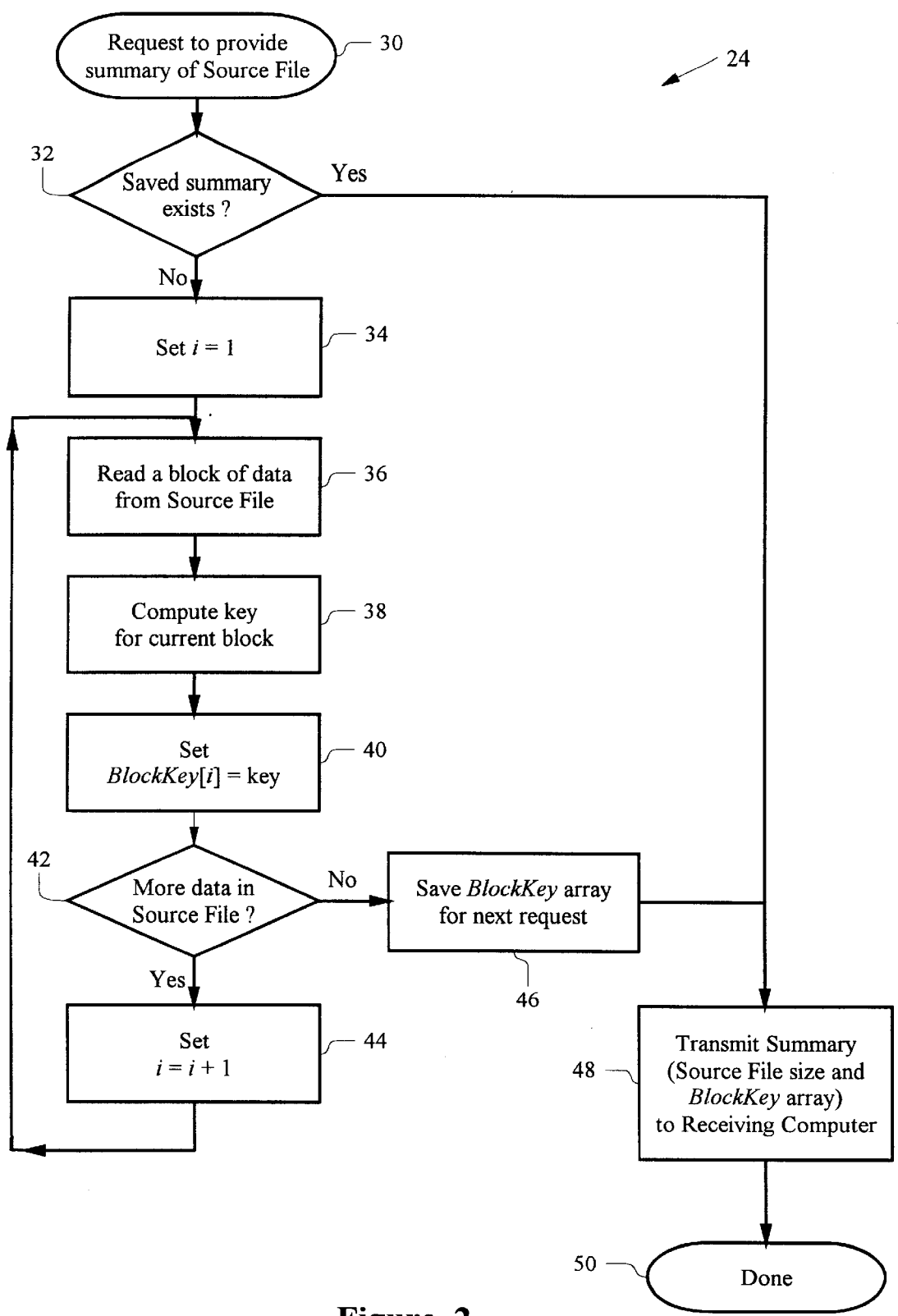
FIG. 2 is a flowchart of a procedure for computing and transmitting a source file summary.

FIG. 2 is a flowchart diagram illustrating the procedural steps involved for the sub-routine 24 for computing the source file summary at the sending computer. Beginning at step 30, a request to provide the source file summary may initiate the procedure 24, for example a request received from the receiving computer. If the source file summary is already in existence and saved at the sending computer (step 32), for example having been computed according to a previous request from another receiving computer, then the procedure continues to step 48 where the source file summary is transmitted to the receiving computer, before the sub-routine terminates at step 50. If no source file summary has been previously computed and stored, then the sub-routine 24 proceeds to step 34 where an index i is initialised. Subsequent steps 36 to 44 of the sub-routine 24 are then carried out in an iterative manner to divide the source file into equal length data blocks and summarise the source file by computing key values for the respective data block values.

A block of data is read from the source file at step 36. Each block of data read from the source file is preferably of equal length comprising a plurality of data units (eg. bytes). For example, each data block may have a length in the range of 64 bytes to 2048 bytes. Longer data blocks have the advantage that the size of the source file summary is reduced and encoding and comparison procedures of the preferred embodiment can be carried out more quickly and efficiently, but conversely longer data blocks also reduce the likelihood of an exact match being found between a lengthy data block in the source file and the reference file. Accordingly, a data block length of the order of 256 to 768 bytes may be appropriate. A key value for the block of data read from the source file at step 36 is then computed at step 38. The purpose of computing a key value for the data block from the source file is to obtain a coded value corresponding to the value of the data in the data block which is of shorter length than the data block itself. Various methods for computing a key value from a data block are possible, as will be apparent to those skilled in the art. For example, a cyclic redundancy check (CRQ operation may be performed on the data block to obtain a key value. Various other methods for obtaining key values are described in U.S. Pat. No. 5,721,907, for example, the disclosure of which is incorporated herein by reference. It will be appreciated that, by compressing the value of the source file data block into a key value some loss of information will ensue, such that a key value is not unique to a given data block. However, it is desirable for a suitable key generation scheme to produce key values which are large enough to sufficiently characterise respective data block values so that a given key value corresponds to a minimal number of different data block values so as to avoid mismatches between data blocks in the source and reference files.

Once a key value for the data block is computed (step 38), that key is stored in a respective BlockKey array position identified by the index i, as indicated at step 40. A test is applied at step 42 to determine if all of the data in the source file has been processed, and if it has then the BlockKey array is stored at step 46 for future reference. Storing the Block-Key array, once generated, for a particular source file enables future calls to the sub-routine 24 by subsequent requests from receiving computers to skip the steps 34 to 44 for generating a BlockKey array, thus saving on time and computational effort for the sending computer to provide the source file summary to the receiving computer. If there are further blocks of data in the source file for which key values have not been computed, then the index i is incremented (step 44), and the procedure returns to step 36 for another iteration. Once all of the source file data has been processed in data blocks and respective key values computed and stored in the BlockKey array, the source file summary is transmitted by way of the communications medium to the receiving computer at step 48. The source file summary may typically comprise the BlockKey array consisting of the plurality of key values for the respective source file data blocks, together with an indication of the size of the source file itself. The sub-routine 24 then terminates at step 50.

Referring again to FIG. 1, once the BlockKey array is received at the receiving computer from the sending computer, the receiving computer procedure 2 executes a sub-routine 8 to compute a BlockFound array. The essence of the BlockFound array computational process 8 is to compare the data in the reference file at the receiving computer with the source file data as represented by the BlockKey array to create a list of reference file portions with which it is found that corresponding source file portions exist. This then enables the corresponding portions of the reference file to be retained at the receiving computer, the portions of the reference file which do not correspond to portions of the source file to be discarded, and the missing portions of the source file to be retrieved from the sending computer so that a replica of the source file can be constructed at the receiving computer. A more detailed flow diagram of the BlockFound array computation sub-routine 8 is illustrated in FIG. 3, and described in greater detail hereinbelow.

Figure 3:
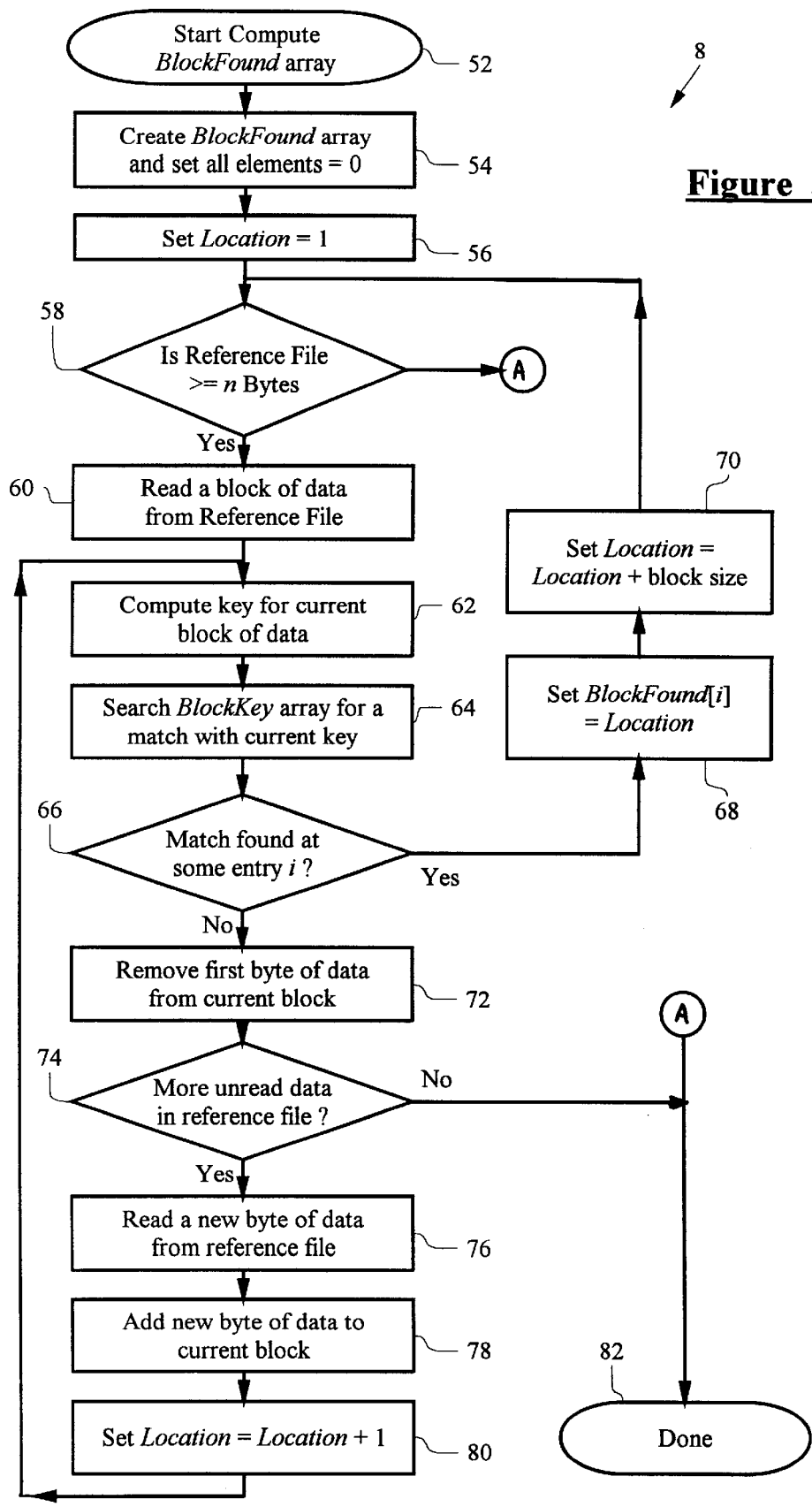
FIG. 3 is a flowchart of a procedure for comparing a source file summary with a reference file at the receiving computer.

With reference to FIG. 3, a compute BlockFound array sub-routine 8 is illustrated in flow diagram form, beginning with an initialisation step 52 at which the BlockKey array is provided, having been received at the receiving computer from the sending computer. At step 54 a BlockFound array is initialised with all elements set initially to zero and at step 56 a Location register is initialised to one. The BlockFound array maintains a record of the locations in the reference file at which a block of data is found corresponding to a block of data in the source file. The Location register maintains a byte-wise index of a current location in the reference file whilst the reference file is sequentially analysed from one end of the data sequence comprising the reference file to the other. At step 58, then, a test is applied to ensure that the length of the reference file is greater than or equal to the block size (represented by n bytes) which was selected for partitioning of the source file. If the reference file is not of the minimum size then the procedure terminates at step 82. Otherwise, compute BlockFound array sub-routine 8 continues to step 60.

At step 60 a block of data is read from the reference file, wherein the size of the data block corresponds to the data block size utilised in coding the source file to form the BlockKey array. In the first iteration of step 60 the data block read from the reference file would begin from the start of the reference file. Having read a block of data from the reference file at step 60, the receiving computer then proceeds to compute a key value for that data block at step 62. The method utilised to compute the key value for a block of data is the same as that used by the sending computer to compute the key values for the source file data blocks. Thus, if a block of data from the source file and a block of data from the reference file are identical then the respective key values from those data blocks will match. Accordingly, the key value for the current block of data is compared with the key values in the BlockKey array (step 64) which represent the data blocks in the source file. If a match is found (step 66) then this indicates that the current block of data in the reference file is also contained in the source file, and thus need not be provided by the sending computer to the receiving computer in order to form a replica of the source file at the receiving computer. Where the reference file data block key value matches the BlockKey array value at a point in the array represented an index i, at step 68 the Block-Found array element at index i is stored with the value of the Location register. Then, the Location register is updated by incrementing by the size of the data block (step 70) to continue the search through the reference file beginning with the next data unit in the file after the matching data block. The sub-routine 8 then returns to step 58 to check the remaining file length before reading the next block of data from the reference file. In the last iteration, the block of data may be shorter in length than the chosen block size.

If no entry in the BlockKey array is found which matches the key value of the current reference file data block then the procedure continues to steps 72 to 80 in which the current data block of the reference file is incremented in position by one data unit (e.g. byte). This involves firstly removing the first byte of data from the current block at step 72. Then, if it determined at step 74 that the end of the reference file has been reached, the processing is complete and the procedure terminates at step 82; otherwise the procedure continues to step 76. The next byte of data is read from the reference file (step 76) and appended to the current block at step 78. Accordingly, the Location register is incremented by one unit at step 80 to indicate that the current data block has moved in position in the reference file by one data unit. The procedure then returns to step 62 to compute a key value for the incremented data block.

Because the search through the reference file is carried out by moving the current data block position by one byte at a time through the reference file (unless a match is found), in the worst case scenario the key value algorithm must be carried out almost as many times as there are bytes of data in the reference file. Accordingly, it is desirable that the key value generation algorithm be computationally efficient. In particular, it is preferable for the key value generation algorithm to be able to easily generate a new key value for a data block given a previous key value for a previous data block which differs from the current data block by only one byte. Numerous methods for generating key values with those characteristics are possible, such as those described in the aforementioned United States patent.

At the completion of the compute BlockFound array sub-routine 8, a BlockFound array is produced which indicates those blocks in the reference file which match blocks in the source file. For example, a BlockFound array element with index i and value Location indicates that a block of data in the reference file starting at the position indicated by Location matches a block of data in the source file corresponding to the position of the data block from which BlockKey element i was formed. This information can therefore be utilised at the receiving computer to retrieve from the sending computer those portions of the source file which are not found in the reference file. Thus, referring again to FIG. 1, at step 12 the BlockFound array is utilised at the receiving computer to identify those portions of the source file to be supplied by the sending computer by examining the entries in the BlockFound array which are equal to zero. This information is supplied to the sending computer in a form of a request for data transmission, and the sending computer responds (step 28) by transmitting the requested blocks from the source file to the receiving computer. It is then a matter of the receiving computer assembling the matching blocks from the reference file 10 and the received blocks from the source file 26 to form a new target file 16 at procedure 14. The sub-routine procedure 14 is illustrated in greater detail in FIG. 4, and described hereinbelow.

Figure 4:
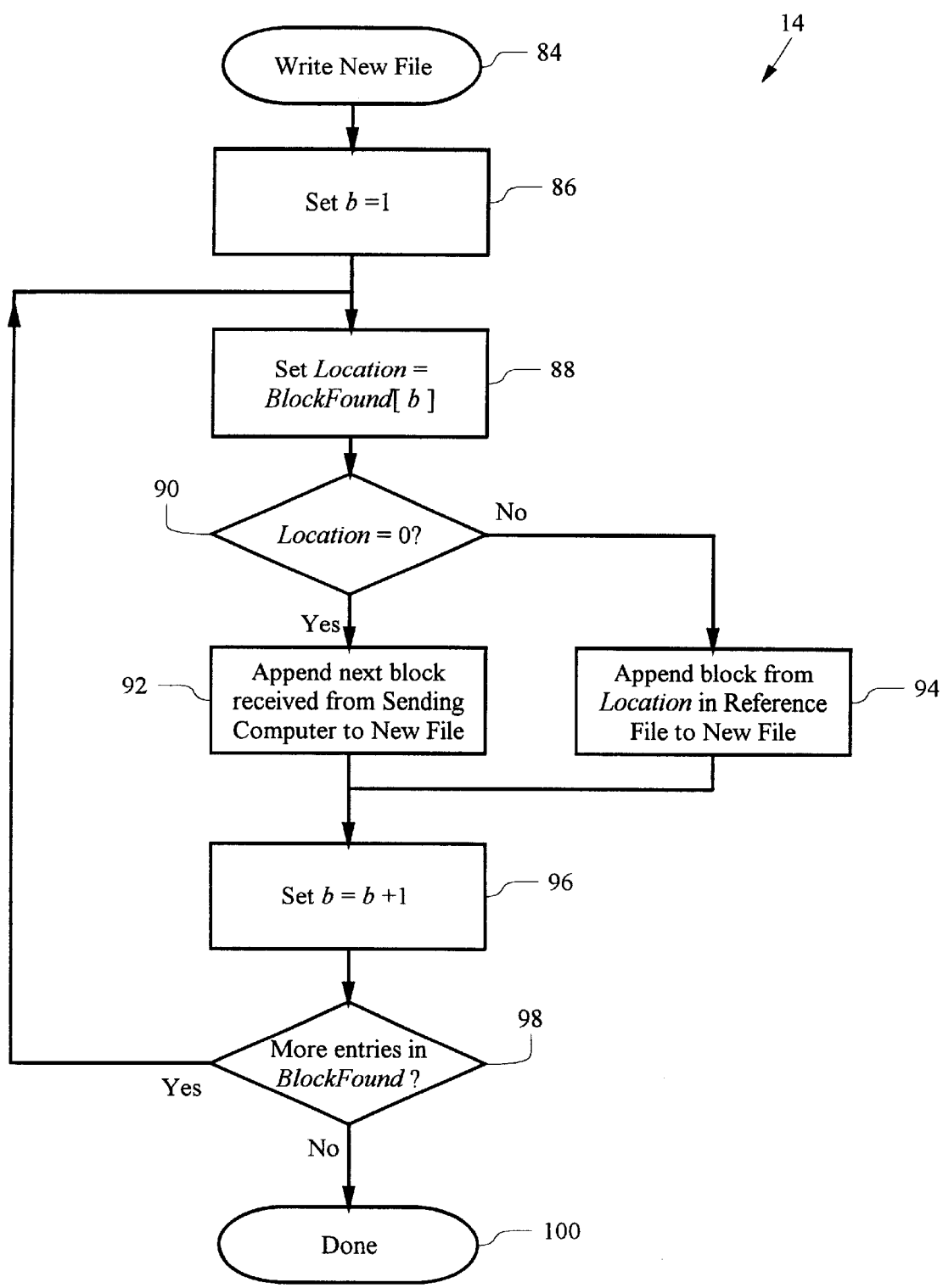
FIG. 4 is a flowchart of a procedure for constructing a target file at the receiving computer which corresponds to the source file at the sending computer.

In FIG. 4 a flowchart of the target file construction procedure is illustrated, beginning at step 84. Firstly, an index b is initialised to value 1 at step 86, and a Location register is set to the value in the BlockFound array at index b (step 88). If the value in the Location register equals zero (step 90), this indicates that the corresponding block of data from the reference file is invalid, and that the next received block of data from the sending computer is to be utilised in the new target file (step 92). If the Location register at step 90 is determined to have a value other than zero, then the Location register value is used as an index to obtain a block of data from the reference file beginning at Location, which has been determined to be valid (ie. matching a block in the source file), and that data block is appended to the new target file (step 94). The index b is then incremented at step 96, and the BlockFound array examined to determine if there are more entries at step 98. If there are no more entries in the BlockFound array then the new target file construction is complete, and the sub-routine 14 terminates at step 100. Otherwise, the procedure returns to step 88 where the Location register is loaded with a new value from the BlockFound array based on the incremented index b. The steps 88 to 98 are thus performed iteratively until the entire BlockFound array is processed.

Having constructed the new file 16 the receiving computer procedure 2 then checks the new file at step 18 to ensure that it matches the source file and that no errors have been made in the reconstruction process. An error in the file reconstruction process can occur where a key value from the source file matches a key value representing a non-matching data block from the reference file. In that case, the reconstruction process cannot succeed, and the complete source file must be transmitted from the sending computer. Once the new target file 16 and source file 26 are found to match completely the procedure terminates at step 20. At this time the new target file 16 at the receiving computer is an exact replica of the source file 26 at the sending computer.

The data synchronising method of the preferred embodiment of the present invention is particularly advantageous for use in computer networks where the sending and receiving computers may not be directly connected to one another, such as where the sending and receiving computers communicate with each other by way of the Internet. For example, the sending computer may be a Web server, and the receiving computer may be coupled to the Internet through an Internet service provider using a proxy server or the like. In that case, the procedures of the preferred embodiment can take advantage of standard Web caching systems so that a proxy computer can satisfy the synchronisation requests of receiving computers, thus further reducing the computational and communications bandwidth burden on the sending computer. In particular, hypertext transport protocol HTTP 1.1 allows for cache requests in individual byte subranges, which enables the present invention to seamlessly exploit the proxy computer caching systems of the world wide web. For example, the source file summary and/or source file data blocks may be cached by a proxy computer using standard techniques, and supplied therefrom directly to the receiving computer. The data file synchronisation procedures of the prior art, on the other hand, have been unable to make use of caches to obtain performance enhancements by virtue of the nature of their operation.

The foregoing detailed description of the present invention has been presented by way of example only and is not intended to be considered limiting to the present invention as defined in the appended claims.

The claims defining the invention are as follows:

1. A method for synchronizing data between a receiving computer and a sending computer, wherein the sending computer has a source file and the receiving computer has a reference file and the receiving and sending computers are coupled for communication therebetween by way of a communications link or network, the method comprising:

i) arranging the source file at the sending computer into a sequence of data blocks, each block comprising a predetermined number of contiguous data units, and computing a source key value for each block in the source file;

ii) transmitting the source key values from the sending computer to the receiving computer;

iii) at the receiving computer, comparing the source key values with reference key values computed for respective blocks comprising a predetermined number of contiguous data units in the reference file to determine matches between source key values and reference key values;

iv) communicating from the receiving computer to the sending computer an indication of which source keys do not have matching reference keys, and transmitting data blocks from the source file corresponding to the unmatched source keys from the sending computer to the receiving computer; and v) constructing at the receiving computer a target file from the contiguous data units in the reference file determined to have reference key values matching respective source key values and the data blocks from the source file received from the sending computer wherein the constructed target file at the receiving computer is synchronized with the source file at the sending computer.

2. A method as in claim 1, wherein the source key values for the sequence of source file data blocks are pre-computed and stored for subsequent use.

3. A method as in claim 2, wherein:

the sending computer and receiving computer are coupled to communicate by way of an intervening computer containing a cache memory, and a copy of the source key values are stored in the intervening computer cache memory and provided therefrom to the receiving computer.

4. A method for constructing a target data file at a first computer from a reference file stored at the first computer and a source file at a remote second computer, the first computer acting as a receiving computer and the remote second computer acting as a sending computer, such that the constructed target file is synchronized with the source file, said method comprising:

i) requesting and receiving from the remote second computer a source file summary comprising a sequence of source key values being codes derived from data blocks of predetermined length making up the source file;

ii) generating reference key values for respective contiguous portions of the reference file of predetermined length and, at the first computer, comparing the reference key values with the received source key values, to determine matches therebetween;

iii) requesting and receiving from the remote second computer those data blocks from the source file for which no match was found between the corresponding source key value and the reference key values at the first computer; and iv) constructing at the first computer a target data file from the received source file data blocks and those contiguous portions of the reference file for which the corresponding reference key value was found to match a source key value, wherein the constructed target file is synchronized with the source file.

5. A method as in claim 4, wherein:

the first and second computers are coupled to communicate over a computer network including a proxy computer which is closer or more conveniently located to communicate with the first computer than is the second computer, and requesting and receiving the source file summary includes providing the source file summary to the first computer from a copy of the source file summary generated at the second computer and previously received and stored by the proxy computer.

6. A method as in claim 5, wherein requesting and receiving data blocks for which no match was found includes providing those data blocks to the first computer from the proxy computer from a copy of the source file data blocks previously provided from the second computer and stored in a cache memory at the proxy computer.

7. In a computer network having a sending computer, a receiving computer and at least one proxy computer, wherein the sending computer has a source file and the receiving computer has a reference file and the receiving, sending and a proxy computer are coupled for communication therebetween by way of said network, a method for synchronizing data between the receiving computer and the sending computer, the method comprising:

i) arranging the source file at the sending computer into a sequence of data blocks, each block comprising a predetermined number of data units, and computing a source key value for each block in the source file;

ii) transmitting the source key values from the sending computer to the receiving computer;

iii) at the receiving computer, comparing the source key values with reference key values computed for respective blocks comprising a predetermined number of contiguous data units in the reference file to determine matches between source key values and reference key values;

iv) communicating from the receiving computer to the sending computer or proxy computer an indication of which source keys do not have matching reference keys, and transmitting data blocks from the source file corresponding to the unmatched source keys from the sending computer or proxy computer to the receiving computer; and v) constructing at the receiving computer a target file from the contiguous data units in the reference file determined to have reference key values matching respective source key values and the data blocks from the source file received from the sending computer wherein the constructed target file at the receiving computer is synchronized with the source file at the sending computer.

8. A method as in claim 7, wherein transmitting the source key values from the sending computer to the receiving computer includes storing a copy of the source key values in a cache at the proxy computer and transmitting the source key values from the proxy computer to the receiving computer on request.

9. A method as in claim 7 wherein:

a copy of at least some of the source file data blocks are transmitted from the sending computer and stored in a cache at the proxy computer; and transmitting data blocks from the source file includes transmitting said data blocks form the proxy computer cache copy to the receiving computer.

10. A method for synchronizing data between a receiving computer and a sending computer, wherein the sending computer has a source file and the receiving computer has a reference file and the receiving and sending computers are coupled for communication therebetween by way of a communications link or network, the method comprising:

(i) computing source key values for sequential non-overlapping source blocks in the source file, each of said source blocks comprising a predetermined number of contiguous data units;

(ii) transmitting the source key values from the sending computer to the receiving computer;

(iii) at the receiving computer, comparing the source key values with reference key values computed for reference data blocks comprising a predetermined number of contiguous data units in the reference file to determine matches between source key values and reference key values;

(iv) communicating from the receiving computer to the sending computer an indication of which source keys do not have matching reference keys, and transmitting source data blocks corresponding to the unmatched source keys from the sending computer to the receiving computer; and (v) constructing at the receiving computer a target file from (a) the reference data blocks having reference key values matching respective source key values, and (b) the source data blocks received from the sending computer, wherein the constructed target file at the receiving computer is synchronized with the source file at the sending computer.

11. A method as claimed in claim 10 wherein said reference key values are computed for overlapping reference data blocks comprising a predetermined number of contiguous data units in the reference file.

12. A method as claimed in claim 10 wherein said reference key values are computed for overlapping and non-overlapping reference data blocks comprising a predetermined number of contiguous data units in the reference file.

13. A method for synchronizing data between a receiving computer and a sending computer, wherein the sending computer has a source file and the receiving computer has a reference file and the receiving and sending computers are coupled for communication therebetween by way of a communications link or network, the method comprising:

(i) computing source key values for sequential non-overlapping source blocks in the source file, each of said source blocks comprising a predetermined number of contiguous data units;

(ii) transmitting the source key values from the sending computer to the receiving computer;

(iii) at the receiving computer, computing a reference key value for a reference data block in the reference file, said reference block comprising a predetermined number of contiguous data units;

(iv) comparing the reference key value with said source key values to determine a matching source key value;

(v) if a matching source key value is determined, selecting the corresponding reference data block and recomputing the reference key value for a new non-overlapping reference data block in the reference file; otherwise, recomputing the reference key value for a new overlapping reference data block in the reference file;

(vi) returning to step (iv) if a new reference data block was determined in step (v);

(vii) communicating from the receiving computer to the sending computer an indication of which source key values do not have matching reference key values, and transmitting source data blocks corresponding to the unmatched source keys from the sending computer to the receiving computer; and (viii) constructing at the receiving computer a target file from (a) the selected reference data blocks whose corresponding reference key values match source key values, and (b) the source data blocks received from the sending computer, wherein the constructed target file at the receiving computer is synchronized with the source file at the sending computer.

14. A method as claimed in claim 13, wherein selecting the reference data block includes storing location data identifying the location of the reference data block in the reference file.

15. A method as claimed in claim 13, wherein the new overlapping reference data block is offset by one byte from the previous reference data block.

* * * * *